United States Patent [19]

Ruby

[11] Patent Number: 5,471,605
[45] Date of Patent: Nov. 28, 1995

[54] APPARATUS FOR UPDATING A MULTI-WAY SET ASSOCIATIVE CACHE MEMORY STATUS ARRAY

[75] Inventor: William M. Ruby, Santa Clara, Calif.

[73] Assignee: Intel Corporation, Santa Clara, Calif.

[21] Appl. No.: 384,622

[22] Filed: Feb. 6, 1995

Related U.S. Application Data

[63] Continuation of Ser. No. 936,252, Aug. 27, 1992, abandoned.

[51] Int. Cl.⁶ .................... G06F 12/00; G06F 12/12; G11C 7/00
[52] U.S. Cl. .................... 395/445; 395/463; 395/483; 395/487; 365/189.07; 365/189.08
[58] Field of Search .................... 395/425, 460, 395/463, 483, 486, 487, 471, 445; 365/189.07, 189.08, 49; 326/121, 122

[56] References Cited

U.S. PATENT DOCUMENTS

| | | | |
|---|---|---|---|
| 4,507,729 | 3/1985 | Takahashi et al. | 395/575 |
| 4,607,331 | 8/1986 | Goodrich, Jr. et al. | 395/425 |
| 4,802,089 | 1/1989 | Shaw | 395/725 |
| 4,905,139 | 2/1990 | Asai et al. | 395/425 |
| 4,967,414 | 10/1990 | Lusch et al. | 371/51.1 |
| 5,014,240 | 5/1991 | Suzuki | 364/DIG. 1 |
| 5,019,971 | 5/1991 | Lefsky et al. | 395/250 |
| 5,140,690 | 8/1992 | Hata et al. | 395/575 |
| 5,228,134 | 7/1993 | MacWilliams et al. | 395/425 |
| 5,274,790 | 12/1993 | Suzuki | 395/425 |
| 5,325,511 | 6/1994 | Collins | 395/425 |

*Primary Examiner*—Glenn Gossage
*Attorney, Agent, or Firm*—Blakely, Sokoloff, Taylor & Zafman

[57] ABSTRACT

A method and apparatus for updating cache memory status bits that depend on match signals of a multi-way set associative cache are disclosed. Faster updating of the status bits is provided by utilizing the fact that there is a match in at most one way of the cache for any read cycle. A first status bit is set to its previous value if no match occurs in any way of the cache. The first status bit is set to a first value if a match has occurred in a first way of the cache and is set to a second value if a match has occurred in a second way of the cache. Fewer transistors are needed to implement the update circuits which, in a preferred embodiment, are realized using complementary metal oxide semiconductor (CMOS) technology. The update circuits may be implemented in an instruction cache translation look aside buffer of a microprocessor for updating least recently used (LRU) array status bits or any cache memory status signals that depend on match signals.

6 Claims, 4 Drawing Sheets

ANYMATCH = MATCH0 OR MATCH1 OR MATCH2 OR MATCH3

ANYMATCH = MATCH0 OR MATCH1 OR MATCH2 OR MATCH3

ANYMATCH = MATCH0 OR MATCH1 OR MATCH2 OR MATCH3

ANYMATCH = MATCH0 OR MATCH1 OR MATCH2 OR MATCH3

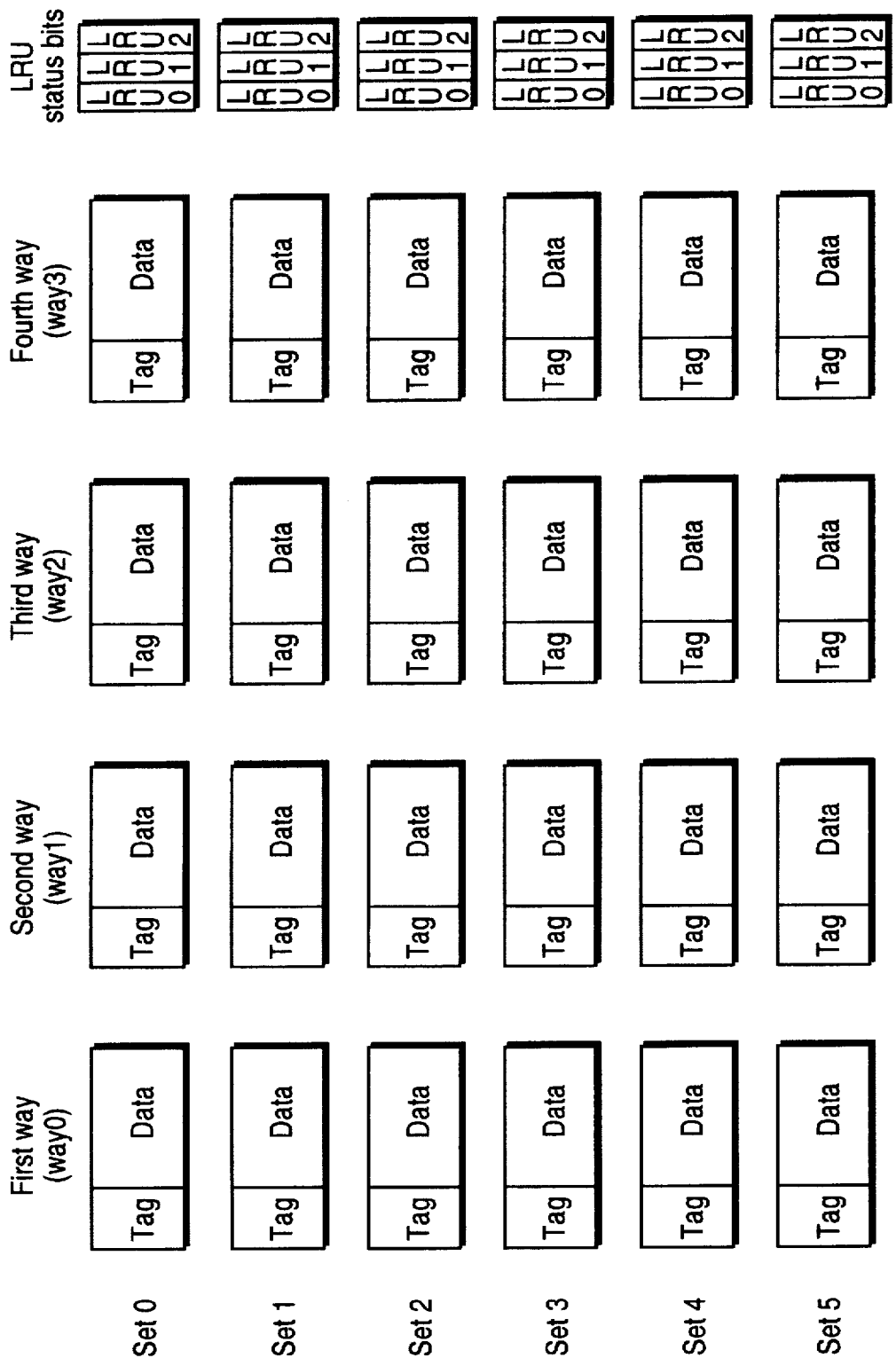

APPARATUS FOR UPDATING A MULTI-WAY SET ASSOCIATIVE CACHE MEMORY STATUS ARRAY

This is a continuation of application Ser. No. 08/936,252, filed Aug. 27, 1992, now abandoned.

BACKGROUND OF THE INVENTION

1. Field of the Invention

The present invention relates generally to the field of cache memories and more specifically to a method and apparatus for updating status bits that depend on the MATCH signals in a multi-way set associative cache memory.

2. Prior Art

The least recently used (LRU) method is widely implemented in multi-way cache memory systems to maximize the cache hit rate. Under the LRU method, the cache memory system records in a LRU status array a limited history of how recently each cache data in the cache memory has been used. The LRU method selectively replaces the least recently used cache data when writing new data into the cache memory such that more recently used data is retained. Because more recently used cache data is more likely to be reused, the cache hit rate is increased.

For each address in the cache memory, the corresponding LRU array status bits indicate the way in which a match last occurred. For example, in a four-way set associative cache three LRU status bits are typically used to indicate the matching way as shown in Table 1.

TABLE 1

| LRU status bit scheme for a four-way cache | |
|---|---|
| LRU0 | A 1 value indicates a match in either way0 or way1; a 0 value indicates a match in either way2 or way3. |
| LRU1 | A 1 value indicates a match in way0; a 0 value indicates a match in way1. |
| LRU2 | A 1 value indicates a match in way2; a 0 value indicates a match in way3. |

Typically, LRU status bits in the LRU array are updated during both cache read and write cycles. In a multi-way set associative cache memory, updating the LRU status bits during a read cycle is timing-critical since the new LRU status bit values depend on the MATCH signals originated in each way of the cache. On a read miss cycle, the old LRU status bit value in the array is preserved. Two ways to preserve the old LRU status bit are disabling any write to the data or reading the data and subsequently writing the same data back into the array. On a read hit cycle, the LRU status bit value is read, updated according to the values of the MATCH signals for each way, and then written into the LRU status bit array. The LRU array status bits are typically updated using combinational logic to directly implement the logic equations that define the updated LRU array status bits.

For example, the following are the logic equations for updating LRU status bits 0, 1, and 2 on a read cycle in a four-way set associative cache.

$$LRU0new = MATCH0 \text{ OR } MATCH1 \text{ OR } ((NOT \text{ } MATCH2) \text{ AND } (NOT \text{ } MATCH3) \text{ AND } LRU0old) \quad (EQ \text{ } 1)$$

$$LRU1new = MATCH0 \text{ OR } ((NOT \text{ } MATCH0) \text{ AND } (NOT \text{ } MATCH1) \text{ AND } LRU1old) \quad (EQ \text{ } 2)$$

$$LRU2new = MATCH2 \text{ OR } ((NOT \text{ } MATCH2) \text{ AND } (NOT \text{ } MATCH3) \text{ AND } LRU2old) \quad (EQ \text{ } 3)$$

Typically these equations are implemented directly in circuitry utilizing a combination of AND, NAND, OR, NOR, or NOT logic gates. However, such a combinational logic circuit implementation is slow at providing the updated LRU status bit values.

Because the MATCH signals are valid very late in the read cycle of a cache, there is little time left to perform the required update of the LRU array status bit values before the write portion of the cycle begins. At higher clock speeds, direct combinational logic LRU status bit update circuitry does not meet the time constraints. Therefore, a method and apparatus for providing faster updating of the LRU array status bits during a read cycle of a cache memory is needed.

The constant drive for higher performance computer systems demands higher performance cache memory systems capable of running at higher clock speeds. Higher clock speeds allow less time for the timing-critical updating of cache memory status signals that depend on the cache MATCH signals. Therefore, a faster method for updating cache memory status bits that depend on the MATCH signals of a multi-way cache memory is needed.

SUMMARY OF THE INVENTION

The present invention provides a method and apparatus for updating the status bits of the LRU array of a multi-way cache memory during a read cycle.

The present invention provides a first circuit including a pass-gate for setting a first status bit to its previous value if no match occurs in any way of the cache. The cache memory has at most one matching way during any read cycle.

The present invention also provides a second circuit including a pull-down transistor for setting the first status bit to a first value if a match has occurred in a first way of the cache.

The present invention further provides a third circuit including a pull-up transistor for setting the first status bit to a second value if a match has occurred in a second way of the cache.

Increased speed is one advantage of the circuit of the present invention. By reducing the complexity of the circuit implementation, the update speed is improved. Another advantage of the present invention is fewer transistors to implement the update circuitry. This also means that less space is required in the chip real estate for a semiconductor circuit implementation.

BRIEF DESCRIPTION OF THE DRAWINGS

FIG. 7 illustrates a multi-way set associative cache memory.

DETAILED DESCRIPTION OF THE PREFERRED EMBODIMENT

Figure 1:
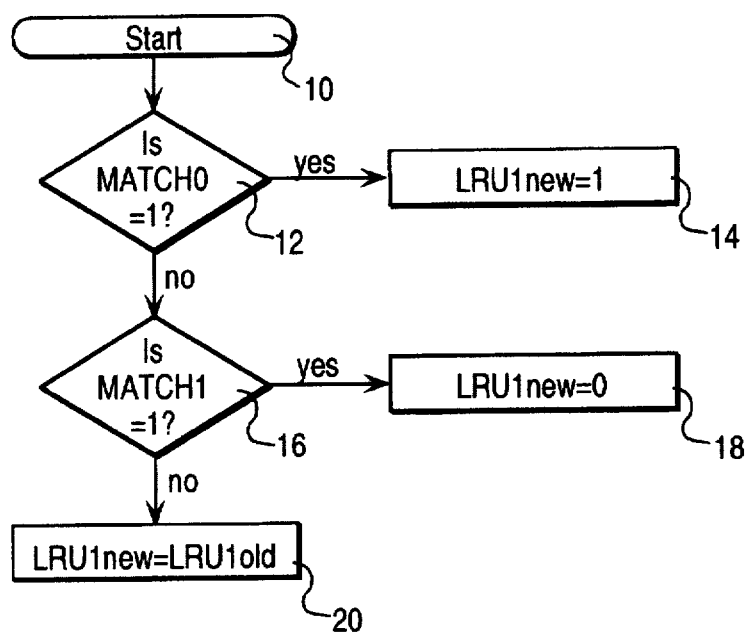
FIG. 1 is a flowchart illustrating the method of the preferred embodiment of the present invention for updating LRU status bit 1 during a cache read cycle.

A method and apparatus for updating the status bits of a multi-way set associative cache memory is described. In the following description, numerous specific details are set forth, such as specific status bits and cache implementations, in order to provide a thorough understanding of the present invention. It will be apparent, however, to one skilled in the art that the present invention may be practiced without these specific details. In other instances, well-known methods and circuits are not described in detail in order not to obscure the present invention.

In a multi-way cache memory system, the LRU array status bits are updated during read cycles according to the value of LRUold, the previous LRU value, and the MATCH signal from each way. The present invention takes advantage of the fact that in a multi-way set associative cache memory there is at most one MATCH signal active in any read cycle. Utilizing this fact the present invention provides an improved method and circuit for updating the LRU array status bits. The present invention is not limited to LRU array status bits, but is useful for any cache memory status signals that depend on the MATCH signals.

If at most one MATCH signal is active during any read cycle, all possible combinations of the terms in EQ 1 and corresponding values of LRU0new are shown in Table 2.

TABLE 2

| | LRU0new values as a function of MATCH signals and LRU0old | | | | | |
|---|---|---|---|---|---|---|
| | LRU0old | MATCH0 | MATCH1 | MATCH2 | MATCH3 | LRU0new |
| 1. | 0 | 0 | 0 | 0 | 0 | 0 |
| 2. | 1 | 0 | 0 | 0 | 0 | 1 |
| 3. | 0 | 1 | 0 | 0 | 0 | 1 |
| 4. | 0 | 0 | 1 | 0 | 0 | 1 |
| 5. | 0 | 0 | 0 | 1 | 0 | 0 |
| 6. | 0 | 0 | 0 | 0 | 1 | 0 |
| 7. | 1 | 1 | 0 | 0 | 0 | 1 |
| 8. | 1 | 0 | 1 | 0 | 0 | 1 |
| 9 | 1 | 0 | 0 | 1 | 0 | 0 |
| 10. | 1 | 0 | 0 | 0 | 1 | 0 |

Rows 1 and 2 reveal that for read misses (all MATCH signals equal 0), the LRU0new value is the same as the LRU0old value. Rows 3, 4, 7, and 8 reveal that LRU0new=1 if either MATCH0 or MATCH1 is 1. Rows 5, 6, 9, and 10 reveal that LRU0new=0 if either MATCH2 or MATCH3 is 1.

Similarly, Table 3 shows all possible combinations of the terms in EQ 2 and corresponding values of LRU1new if at most one MATCH signal is active during any read cycle.

TABLE 3

| | LRU1new values as a function of MATCH signals and LRU1old | | | |
|---|---|---|---|---|
| | LRU1old | MATCH0 | MATCH1 | LRU1new |
| 1. | 0 | 0 | 0 | 0 |
| 2. | 1 | 0 | 0 | 1 |
| 3. | 0 | 1 | 0 | 1 |
| 4. | 0 | 0 | 1 | 0 |
| 5. | 1 | 1 | 0 | 1 |
| 6. | 1 | 0 | 1 | 0 |

Rows 1 and 2 reveal that if MATCH0 and MATCH1 equal 0 the LRU1new value is the same as the LRU1old value. Rows 3 and 5 reveal that LRU1new=1 if MATCH0 is 1. Rows 4 and 6 reveal that LRU1new=0 if MATCH1 is 1.

Finally, Table 4 shows all possible combinations of the terms in EQ 3 and corresponding values of LRU2new if at most one MATCH signal is active during any read cycle.

TABLE 4

| | LRU2new values as a function of MATCH signals and LRU2old | | | |
|---|---|---|---|---|
| | LRU2old | MATCH2 | MATCH3 | LRU2new |
| 1. | 0 | 0 | 0 | 0 |
| 2. | 1 | 0 | 0 | 1 |
| 3. | 0 | 1 | 0 | 1 |
| 4. | 0 | 0 | 1 | 0 |
| 5. | 1 | 1 | 0 | 1 |
| 6. | 1 | 0 | 1 | 0 |

Rows 1 and 2 reveal that if MATCH2 and MATCH3 equal 0 the LRU2new value is the same as the LRU2old value. Rows 3 and 5 reveal that LRU2new=1 if MATCH2 is 1. Rows 4 and 6 reveal that LRU2new=0 if MATCH3 is 1.

Referring now to FIG. 1. FIG. 1 is a flowchart illustrating the preferred embodiment of the method of the present invention for updating LRU status bit 1 during a cache read cycle. The method begins at step 10. Step 12 determines whether MATCH0 equals 1. If MATCH0 equals 1, then LRU1new is updated to 1 in step 14; otherwise step 16 determines whether MATCH1 equals 1. If MATCH1 equals 1 then LRU1new is updated to 0 in step 18; otherwise LRU1new retains the LRU1old value in step 20.

Figure 2:
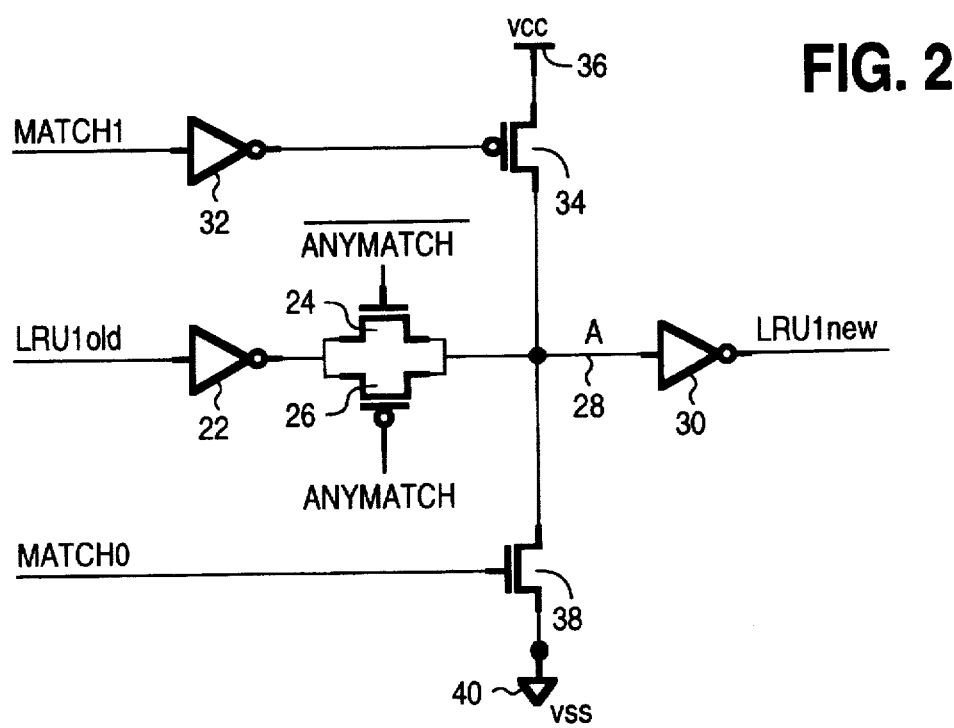
FIG. 2 is a schematic drawing of the circuit of the preferred embodiment of the present invention for updating LRU status bit 1.

FIG. 2 is a schematic of the preferred embodiment of the circuit of the present invention for updating LRU status bit 1. This circuit implements the relationships of table 3 and the method of FIG. 1, and includes a pass gate for preserving the value of the LRU status bit 1, and circuits for setting the LRU status bit 1 to first and second logical values. LRU1old is the input to inverter 22. The output of inverter 22 is coupled to the input of a pass-gate formed by n-channel transistor 24 and p-channel transistor 26. n-channel transistor 24 and p-channel transistor 26 are connected in parallel (i.e., their drains and sources are respectively coupled together). The gate of p-channel transistor 26 is coupled to ANYMATCH; the gate of n-channel transistor 24 is coupled to ANYMATCH (or NOT ANYMATCH). ANYMATCH is the logical OR of MATCH0, MATCH1, MATCH2, AND MATCH3. The output of the pass-gate is coupled to node A 28 which is the input to inverter 30. The output of inverter 30 is LRU1new. When ANYMATCH equals 0 (indicating no match in any way of the cache), the pass-gate is open causing LRU1new to have the same logical value as LRU1old, thereby preserving the value of LRU1old.

MATCH1 is input to inverter 32 whose output is coupled to the gate of p-channel transistor 34. The source of p-channel transistor 34 is coupled to power supply VCC 36. The drain of p-channel transistors 34 is coupled to node A 28. If MATCH1 is a logical 1, inverter 32 causes p-channel transistor 34 to drive or set node A 28 to a logical 1 causing inverter 30 to set LRU1new to logical 0.

MATCH0 is coupled to the gate of n-channel transistor 38. The source of n-channel transistor 38 is coupled to ground VSS 40. The drain of n-channel transistor 38 is coupled to node A 28. If MATCH0 is a logical 1, n-channel transistor 38 set node A 28 to a logical 0 causing inverter 30 to set LRU1new to logical 1.

Figure 3:
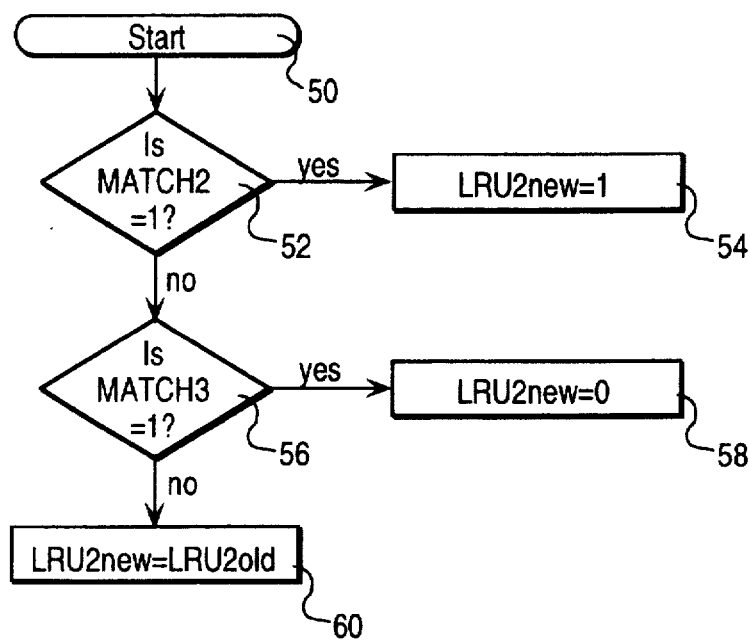
FIG. 3 is a flowchart illustrating the method of the preferred embodiment of the present invention for updating LRU status bit 2 during a cache read cycle.

FIG. 3 is a flowchart illustrating the preferred embodiment of the method of the present invention for updating LRU status bit 2 during a cache read cycle. The method begins at step 50. Step 52 determines whether MATCH2 equals 1. If MATCH2 equals 1 then LRU2new is updated to 1 in step 54; otherwise step 56 determines whether MATCH3 equals 1. If MATCH3 equals 1 then LRU2new is updated to 0 in step 58; otherwise LRU2new retains the LRU2old value in step 60.

Figure 4:
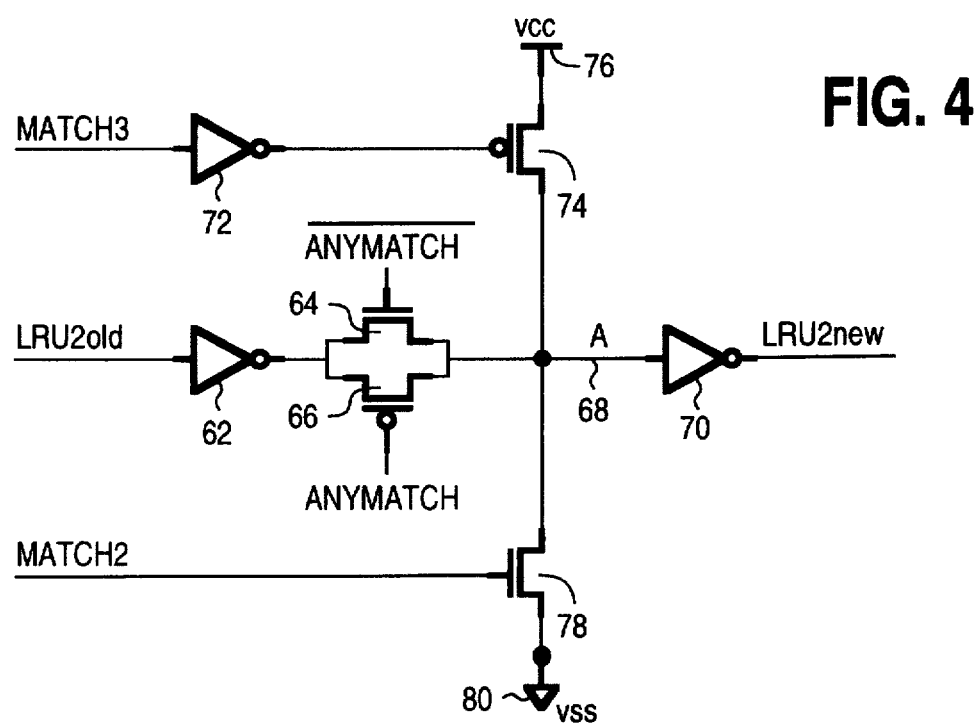
FIG. 4 is a schematic drawing of the circuit of the preferred embodiment of the present invention for updating LRU status bit 2.

FIG. 4 is a schematic of the preferred embodiment of the circuit of the present invention for updating LRU status bit 2. This circuit implements the relationships of table 4 and the method of FIG. 3. LRU2old is the input to inverter 62. The output of inverter 62 is coupled to the input of a pass-gate formed by n-channel transistor 64 and p-channel transistor 66. n-channel transistor 64 and p-channel transistor 66 are connected in parallel. The gate of p-channel transistor 66 is coupled to ANYMATCH; the gate of n-channel transistor 64 is coupled to NOT ANYMATCH. ANYMATCH is the logical OR of MATCH0, MATCH1, MATCH2, AND MATCH3. The output of the pass-gate is coupled to node A 68 which is the input to inverter 70. The output of inverter 70 is LRU2new. When ANYMATCH equals 0 (indicating no match in any way of the cache), the pass-gate is open causing LRU2new to have the same logical value as LRU2old, thereby preserving the value of LRU2old.

MATCH3 is input to inverter 72 whose output is coupled to the gate of p-channel transistor 74. The source of p-channel transistor 74 is coupled to power supply VCC 76. The drain of p-channel transistor 74 is coupled to node A 68. If MATCH3 is a 1, inverter 72 causes p-channel transistor 74 to drive node A 68 to a 1 causing inverter 70 to set LRU2new to 0.

MATCH2 is coupled to the gate of n-channel transistor 78. The source of n-channel transistor 78 is coupled to ground VSS 80. The drain of n-channel transistor 78 is coupled to node A 68. If MATCH2 is a 1, n-channel transistor 78 sets node A 68 to a 0 causing inverter 70 to set LRU2new to 1.

Figure 5:
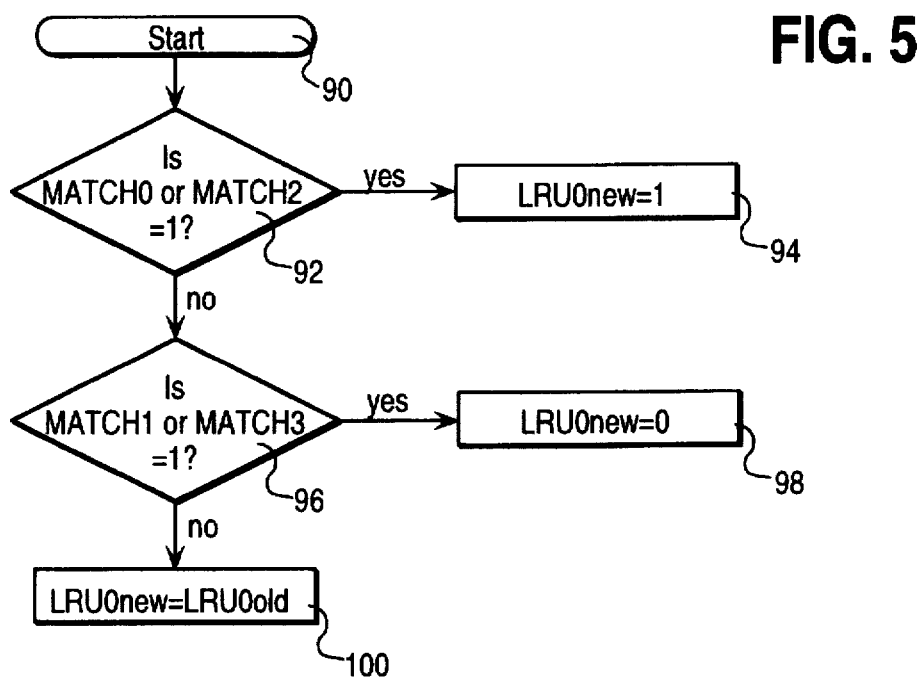
FIG. 5 is a flowchart illustrating the method of the preferred embodiment of the present invention for updating LRU status bit 0 during a cache read cycle.

FIG. 5 is a flowchart illustrating the preferred embodiment of the method of the present invention for updating LRU status bit 0 during a cache read cycle. The method begins at step 90. Step 92 determines whether MATCH0 or MATCH2 equals 1. If either MATCH0 or MATCH2 equals 1 then LRU0new is updated to 1 in step 94; otherwise step 96 determines whether MATCH1 or MATCH3 equals 1. If either MATCH1 or MATCH3 equals 1 then LRU0new is updated to 0 in step 98; otherwise LRU0new retains the LRU0old value in step 100.

Figure 6:
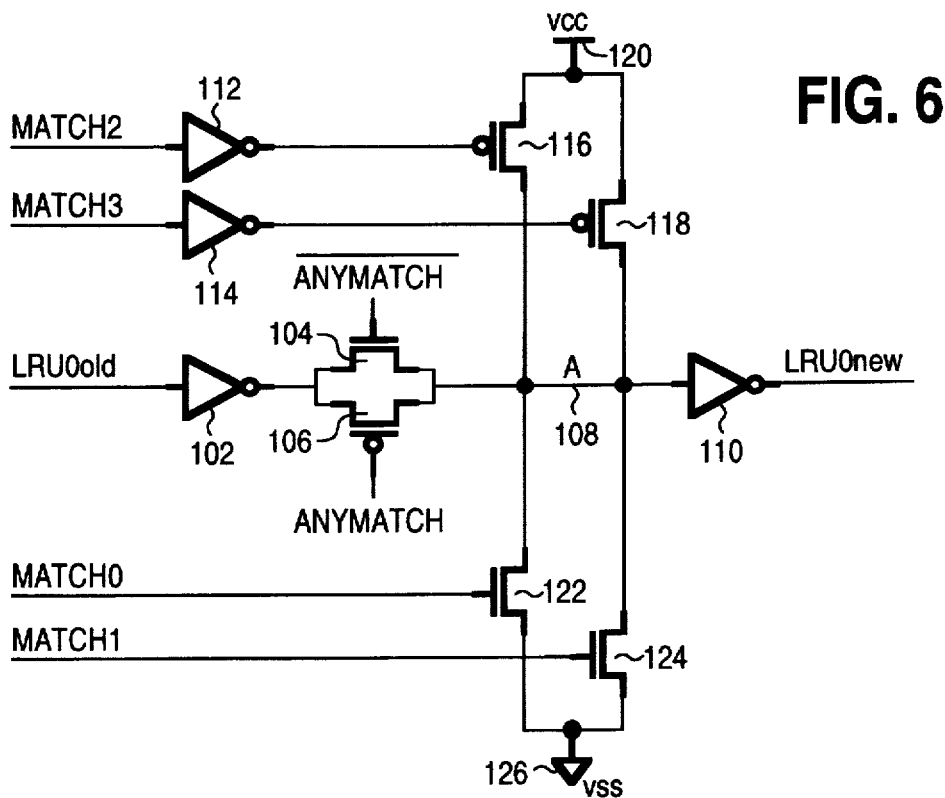
FIG. 6 is a schematic drawing of the circuit of the preferred embodiment of the present invention for updating LRU status bit 0.

FIG. 6 is a schematic of the preferred embodiment of the circuit of the present invention for updating LRU status bit 0. This circuit implements the relationships of table 2 and the method of FIG. 5. LRU0old is the input to inverter 102. The output of inverter 102 is coupled to the input of a pass-gate formed by n-channel transistor 104 and p-channel transistor 106. n-channel transistor 104 and p-channel transistor 106 are connected in parallel. The gate of p-channel transistor 106 is coupled to ANYMATCH; the gate of n-channel transistor 104 is coupled to NOT ANYMATCH. ANYMATCH is the logical OR of MATCH0, MATCH1, MATCH2, AND MATCH3. The output of the pass-gate is coupled to node A 108 which is the input to inverter 110. The output of inverter 110 is LRU0new. When ANYMATCH equals 0 (indicating no match in any way of the cache), the pass-gate is open causing LRU0new to have the same logical value as LRU0old, thereby preserving the value of LRU0old.

MATCH2 is input to inverter 112 whose output is coupled to the gate of p-channel transistor 116. MATCH3 is input to inverter 114 whose output is coupled to the gate of p-channel transistor 118. The sources of p-channel transistors 116 and 118 are coupled to power supply VCC 120. The drains of p-channel transistors 116 and 118 are coupled to node A 108. If MATCH2 is a 1, inverter 112 will cause p-channel transistor 116 to set node A 108 to a 1 causing inverter 110 to set LRU0new to 0. If MATCH3 is a 1, inverter 114 will cause p-channel transistor 118 to set node A 108 to a 1 causing inverter 110 to set LRU0new to 0.

MATCH0 is coupled to the gate of n-channel transistor 122. MATCH1 is coupled to the gate of n-channel transistor 124. The sources of n-channel transistors 122 and 124 are coupled to ground VSS 126. The drains of n-channel transistors 122 and 124 are coupled to node A 108. If MATCH1 is a 1, n-channel transistor 122 sets node A 108 to a 0 causing inverter 110 to set LRU0new to 1. If MATCH1 is a 1, n-channel transistor 124 sets node A 108 to a 0 causing inverter 110 to set LRU0new to 1.

FIG. 7 illustrates a four-way set associative cache which may be used in conjunction with the present invention. The cache illustrated by FIG. 7 contains six sets (labeled Set 0 through Set 5) each comprising four ways (labeled way0 through way3) for a total of 24 blocks of memory which may be accommodated by this multi-way set associative cache configuration. A set comprises associated locations of the individual ways of a set associative cache. The number of sets may obviously vary depending on a particular cache design. The LRU status bits provide information on which of the four ways in a set a particular block of information should be entered in order to maximize the cache hit rate. For example, if a new piece of data associated with Set 2 is pulled out of main memory, and the LRU status bits indicate that the second way (way1) of Set 2 has been least recently used, the new data will replace the old data in the second way of Set 2.

The circuits of the present invention are readily realized using well-known, complementary metal-oxide semiconductor (CMOS) fabrication technology. The circuits of the preferred embodiment of the present invention are implemented in the instruction cache translation lookaside buffer of one of Intel Corporation's (Santa Clara, Calif.) high performance Pentium™ microprocessors. The present invention contributes to the high speed performance of Pentium™ microprocessors allowing operation at clock speeds greater than 66 megahertz (Mhz).

For example, when operating at 66 Mhz, Pentium™ microprocessors allow about 15 nanoseconds (ns) overall for the read-update-write operation of the LRU status array during a read access of the instruction cache. The MATCH signals of the cache are valid at about 5.5 ns after the beginning of the cycle. The write cycle begins at about 7.2 ns. Therefore, 1.7 ns is the maximum time allowed for the required update of the LRU status bits. Implementing the LRU status bit equations using standard combinational logic is far too slow. However, the methods and circuits of the present invention perform the LRU status bit update within the allowed 1.7 ns.

In addition to increased speed, another advantage of the circuits of the present invention is that they reduce the required number of transistors. For example, a direct logic implementation of EQ 1 would require 16 transistors in CMOS; the present invention requires 14. A direct logic implementation of EQ 2 or 3 would require 14 transistors in CMOS; the present invention requires 10. Also reading/updating/writing the LRU status bits regardless of the MATCH signal values allows the timing and control circuitry of the cache to be simplified significantly.

The preferred embodiment of the methods and circuits of the present invention have been specifically described with respect to the LRU status bits. However, the methods and circuits of the present invention apply to updating any status bits that depend on a match in at most one way of a multi-way cache memory.

Thus, a method and apparatus for updating status bits that depend on a match in at most one way of a multi-way set associative cache memory has been described.

What is claimed is:

1. In a multi-way set associative cache memory, an apparatus for updating status bits wherein the status bits depend on a match in at most one way of said cache memory, the apparatus comprising:

a first transistor of a first conductivity type, a gate of said first transistor being coupled to a first match signal, a source of said first transistor being coupled to a power supply, a drain of said first transistor being coupled to a first node;

a second transistor of said first conductivity type and a third transistor of a second conductivity type, drains of said second and third transistors being coupled together and to said first node, sources of said second and third transistors being coupled together and to a first old status bit, gates of said second and third transistors being coupled to a fifth signal, said fifth signal causing said second and third transistors to turn on only when there is no match in any way of said cache memory; and a fourth transistor of said second conductivity type, a gate of said fourth transistor being coupled to a second match signal, a source of said fourth transistor being coupled to ground, a drain of said fourth transistor being coupled to said first node, said first node providing a first updated status bit.

2. The apparatus recited in claim 1, further comprising:

a fifth transistor of said first conductivity type, a gate of said fifth transistor being coupled to a third match signal, a source of said fifth transistor being coupled to said power supply, a drain of said fifth transistor being coupled to a second node;

a sixth transistor of said first conductivity type and a seventh transistor of said second conductivity type, drains of said sixth and seventh transistors being coupled together and to said second node, sources of said sixth and seventh transistors being coupled together and to a second old status bit, gates of said sixth and seventh transistors being coupled to said fifth signal, said fifth signal causing said sixth and seventh transistors to turn on only when there is no match in any way of said cache memory; and an eighth transistor of said second conductivity type, a gate of said eighth transistor being coupled to a fourth match signal, a source of said eighth transistor being coupled to ground, a drain of said eighth transistor being coupled to said second node, said second node providing a second updated status bit.

3. The apparatus recited in claim 2, further comprising:

a ninth transistor of said first conductivity type, a gate of said ninth transistor being coupled to said fourth match signal, a source of said ninth transistor being coupled to said power supply, a drain of said ninth transistor being coupled to a third node;

a tenth transistor of said first conductivity type, a gate of said tenth transistor being coupled to said third match signal, a source of said tenth transistor being coupled to said power supply, a drain of said tenth transistor being coupled to said third node;

an eleventh transistor of said first conductivity type and a twelfth transistor of said second conductivity type, drains of said eleventh and twelfth transistors being coupled together and to said third node, sources of said eleventh and twelfth transistors being coupled together and to a third old status bit, gates of said eleventh and twelfth transistors being coupled to said fifth signal, said fifth signal causing said eleventh and twelfth transistors to turn on only when there is no match in any way of said cache memory;

a thirteenth transistor of said second conductivity type, a gate of said thirteenth transistor being coupled to said first match signal, a source of said thirteenth transistor being coupled to ground, a drain of said thirteenth transistor being coupled to said third node;

a fourteenth transistor of said second conductivity type, a gate of said fourteenth transistor being coupled to said second match signal, a source of said fourteenth transistor being coupled to ground, a drain of said fourteenth transistor being coupled to said third node, said third node providing a third updated status bit.

4. The apparatus of claim 3, wherein said first conductivity type is p-type and said second conductivity type is n-type.

5. The apparatus of claim 3, wherein said first, second, and third updated status bits are least recently used (LRU) bits LRU1new, LRU2new, and LRU0new, respectively, for an address in said cache memory, where a logical 1 for LRU1new indicates a match last occurred in way0 while a logical 0 indicates a match last occurred in way1, a logical 1 for LRU2new indicates a match last occurred in way2 while a logical 0 indicates a match last occurred in way3, and a logical 1 for LRU0new indicates a match last occurred in either way0 or way1 while a logical 0 indicates a match last occurred in either way2 or way3.

6. The apparatus of claim 3, wherein said first, second, third, and fourth match signals are MATCH1, MATCH0, MATCH3, and MATCH2, respectively, where MATCH1 indicates a match in way1, MATCH0 indicates a match in way0, MATCH3 indicates a match in way3, and MATCH2 indicates a match in way2 of said cache memory.

* * * * *

UNITED STATES PATENT AND TRADEMARK OFFICE
CERTIFICATE OF CORRECTION

PATENT NO. : 5,471,605
DATED : November 28, 1995
INVENTOR(S) : Ruby

It is certified that error appears in the above-identified patent and that said Letters Patent is hereby corrected as shown below:

On the title page, Section [54], and in the title in column 1, line 1, insert --THE STATUS BITS IN-- between "UPDATING" and "A", so that the entire title reads APPARATUS FOR UPDATING THE STATUS BITS IN A MULTI-WAY SET ASSOCIATIVE CHACHE MEMORY STATUS ARRAY--.

Signed and Sealed this

Tenth Day of December, 1996

Attest:

BRUCE LEHMAN

Attesting Officer

Commissioner of Patents and Trademarks